United States Patent
Reich et al.

[11] Patent Number: 6,120,091
[45] Date of Patent: Sep. 19, 2000

[54] MOLDED HEADLINER WITH RELATIVELY RIGID FRAME IN COMBINATION WITH A LESS RIGID MAT

[75] Inventors: Ronald K. Reich; Stephen J. Learman, both of Saline, Mich.

[73] Assignee: Lear Automotive Dearborn, Inc., Southfield, Mich.

[21] Appl. No.: 09/094,057

[22] Filed: Jun. 9, 1998

[51] Int. Cl.[7] .................................................. B60R 13/02
[52] U.S. Cl. ........................................ 296/214; 296/39.1
[58] Field of Search ...................................... 296/214, 39.1

[56] References Cited

U.S. PATENT DOCUMENTS

| | | | |
|---|---|---|---|
| 3,366,026 | 1/1968 | Herr et al. | 296/214 X |
| 3,635,519 | 1/1972 | Foster et al. | 296/214 X |
| 3,876,246 | 4/1975 | Lutz et al. | 296/214 |
| 4,119,794 | 10/1978 | Matsuki | 296/214 X |
| 4,149,749 | 4/1979 | Canal | 296/214 X |
| 4,933,225 | 6/1990 | Abe | 296/214 X |
| 4,981,323 | 1/1991 | Dowd et al. | 296/214 |
| 5,011,218 | 4/1991 | Danner et al. | 296/214 |
| 5,120,593 | 6/1992 | Kurihara | 296/214 X |
| 5,269,060 | 12/1993 | Dowd et al. | 296/214 X |
| 5,331,525 | 7/1994 | Lawassani et al. | 296/214 X |
| 5,403,064 | 4/1995 | Mahler et al. | 296/214 |
| 5,484,186 | 1/1996 | Van Order et al. | 296/214 X |
| 5,519,917 | 5/1996 | Cordonnier | 296/214 X |
| 5,538,310 | 7/1996 | Frankhouse et al. | 296/214 X |
| 5,560,575 | 10/1996 | Krysiak | 296/214 X |
| 5,662,375 | 9/1997 | Adams et al. | 296/214 |
| 5,688,022 | 11/1997 | Adams et al. | 296/214 |
| 5,820,205 | 10/1998 | Ammons | 296/214 |
| 5,825,096 | 10/1998 | Morimoto et al. | 296/214 X |
| 5,887,939 | 3/1999 | Yamaguchi et al. | 296/214 X |

FOREIGN PATENT DOCUMENTS

| | | | |
|---|---|---|---|
| 248240 | 12/1987 | European Pat. Off. | 296/214 |
| 898555 | 12/1987 | Germany | 296/214 |
| 208145 | 8/1990 | Japan | 296/214 |

*Primary Examiner*—Joseph D. Pape
*Attorney, Agent, or Firm*—MacMillan, Sobanski & Todd, LLC

[57] ABSTRACT

A headliner assembly includes a molded structural headliner frame. The headliner frame can include at least one accessory integrally molded to the headliner frame. The headliner frame imparts structural integrity to the headliner assembly. The use of a molded headliner frame incorporating at least one integrally molded accessory reduces the overall weight and cost of the headliner assembly. Also, the use of integrally molded accessories eliminates cost in the manufacture of the headliner assembly, which is an improvement over the prior art.

12 Claims, 2 Drawing Sheets

MOLDED HEADLINER WITH RELATIVELY RIGID FRAME IN COMBINATION WITH A LESS RIGID MAT

BACKGROUND OF THE INVENTION

The present invention relates to a headliner formed from a frame and a mat.

In modern vehicles, headliners are typically placed in the vehicle to provide a ceiling covering. Typically, headliner assemblies are non-structural elements having little structural framework. A decorative covering is usually affixed to an outer surface.

Modern headliners are intended to provide a number of qualities. To this end, several layers of different materials are combined to achieve an overall design goal. As an example, some layers may be selected for acoustic characteristics. While the layers are there for sound or appearance, they also must not sag. Thus, other layers may be included to provide adequate support and strength to the headliner.

Recently, so-called modular headliner assemblies have been manufactured wherein various components such as hooks, handles, wire harness guides, and other attachment features are fixed to the headliner assembly. These components are formed and then separately assembled and fixed to the headliner structure thereby increasing the cost of the headliner assembly.

SUMMARY OF THE INVENTION

In a disclosed embodiment of this invention, a headliner assembly includes a rigid headliner frame. A layer, or mat, of headliner material is attached to the frame. The frame approximates the boundaries of the headliner and provides support without the need of a separate support layer. In preferred embodiments, the headliner frame can include at least one accessory molded on either an exposed face or a non-exposed face of the headliner assembly.

The headliner frame can have a decorative face which is exposed to the interior of the vehicle. In such an embodiment, the headliner material layer is preferably disposed within the boundaries of the headliner frame. Alternatively, the headliner material layer can be placed beneath the frame to completely cover the boundaries of the headliner frame.

In a preferred embodiment of this invention, accessories are integrally molded onto either the face of the headliner frame facing into the vehicle and/or onto the second, non-exposed face of the headliner frame. The integrally molded accessories can include visor retaining mechanisms, coat hooks, handles, fasteners for attaching the headliner assembly to the ceiling of the vehicle, accessory mounting sites such as for a dome light assembly or overhead console guides for retaining and guiding wiring harnesses, energy management accessories, speaker grills, and air vent grills and/or ducts.

Essentially, the frame is formed as an integral part by injection molding from an appropriate polymeric material. This invention has improvements over the prior art which has not utilized a separate headliner frame.

Additionally, the invention has improvements over the prior art which has utilized non-integral accessories to form a headliner assembly. The present invention is able to provide a headliner assembly which maximizes the structural properties of the headliner assembly while also allowing the integration of various accessories to the headliner frame in a single molding operation. This results in a stronger, light weight structural headliner assembly which can integrate many individual accessories while reducing the manufacturing cost of the headliner assembly.

The use of the frame allows the elimination of headliner mat layers that may have otherwise been necessary to provide sufficient support. As such, the invention reduces the weight and volume of headliner material which is necessary.

The present invention thus provides a more cost effective mechanism for constructing a headliner assembly and also allows for the assembly to be uniquely tailored for specific manufacturing requirements.

These and other features of the present invention can be best understood from the following specification and drawings, the following of which is a brief description.

DESCRIPTION OF THE PREFERRED EMBODIMENTS

Figure 1:
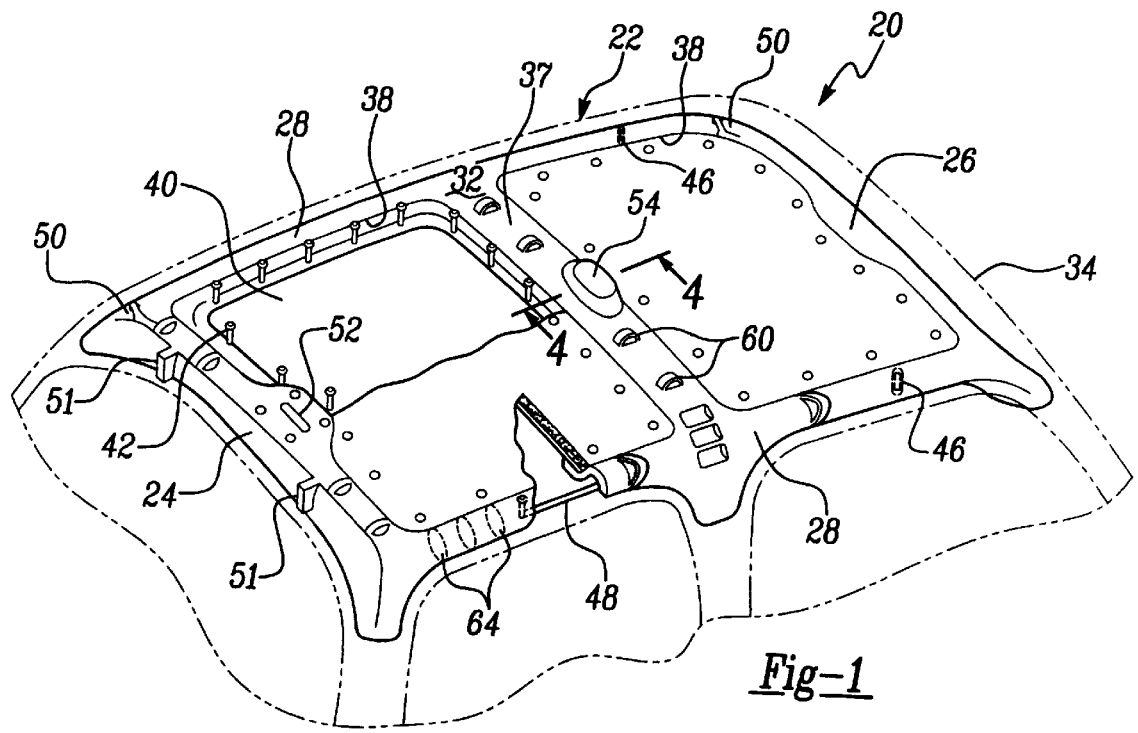
FIG. 1 is a perspective view, partially cut away, of a headliner assembly according to the present invention.

FIG. 1 shows a headliner assembly 20 having a headliner frame 22 defined by a front rail 24 and rear rail 26 extending between lateral sides 28. The headliner frame 22 has a lower face 30 and an upper face 32. The headliner is received beneath the ceiling 36 of a vehicle 34. The front rail 24 and rear rail 26 can also be utilized as integrated roof bows for providing structure to the roof of the automobile thereby replacing sheet metal roof bows which are currently in use. In addition to the front 24 and rear 26 rails, other cross-car members which extend from side to side in the headliner frame 22 can be provided as roof bows.

Headliner mats or panels 40 are secured to frame 22 to cover spaces between the rails 24, 26 and sides 28. The mats of panels 40 are preferably selected to provide acoustic characteristics, etc., and are of typical headliner materials. The frame 22 is more rigid than the panels 40. The combination of the frame and panels increases the speed and ease with which the acoustic headliner panels 40 can be manufactured and installed. That is, relatively small, flat panels 40 are more easily formed and installed.

In the FIG. 1 embodiment, a center rail 37 extends between the sides 28. Spaces 38 are defined by the front rail 24, rear rail 26, sides 28 and center rail 37. Headliner panels 40 are disposed within each space 38 and is retained by any suitable fastening method such as by utilizing heat stakes 42. Alternatively, the headliner panel 40 can be attached utilizing an adhesive or by premelting a portion of the panel 40 and attaching it to the headliner frame 22 using a compression tool. The headliner panel 40 can be constructed of thermoplastic materials such as polyesters, polypropylene, polyethylene terephthalate, and nylon preferably formed into a mat and can include multiple layers and/or reinforcements.

In one aspect of this invention, various accessories can be integrally molded simultaneously with the molding of the headliner frame 22. These accessories can be disposed on either the lower face 30 or the upper face 32 of the headliner frame 22. For example, a visor retainer 44 can be integrally formed to receive a visor tip pin (not shown). A coat hook 46 and/or a handle 48 can be integrally molded and disposed on the lower face 30. In addition, accessories can be disposed on the upper face 32 including fasteners 50 for attachment of the headliner assembly 20 to sheet metal features disposed on the ceiling 36 of the vehicle 34 for affixing the headliner assembly 20 within the vehicle 34. Stand-offs or orienting features 51 can also be integrally molded into the headliner frame 22 to facilitate placement and orientation of the headliner assembly 20 within the vehicle 34.

Accessory mounting positions 52 or dome light housing 54 can also be integrally molded within the headliner frame 22 of the headliner assembly 20. The accessory mounting positions 52 can be utilized to attach various items such as overhead consoles or lights.

Figure 2:
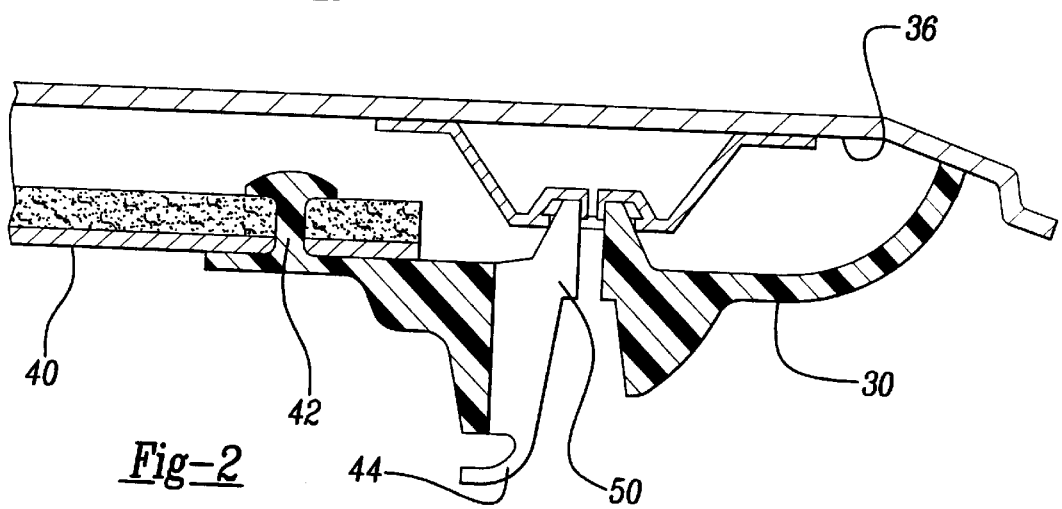
FIG. 2 is a cross-sectional view of a portion of the headliner assembly according to the present invention.

As shown in FIG. 2, the headliner mat 40 is secured to the headliner frame 22 utilizing heat stakes 42. The fastener 50 is used to affixed the headliner assembly 20 to the sheet metal portion of the vehicle ceiling 36. Also, a visor retainer 44 is shown.

Figure 3:
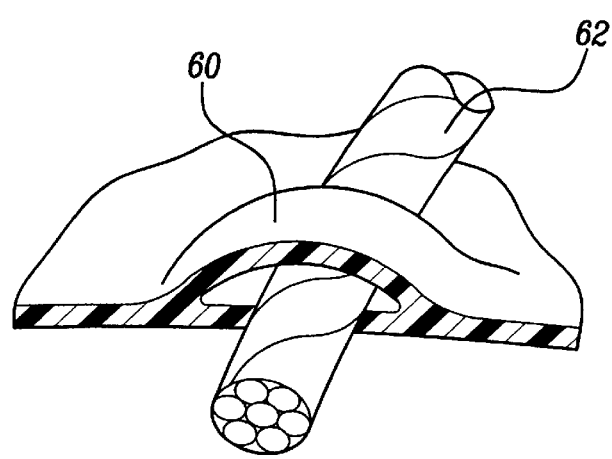
FIG. 3 is a perspective view, partially in cross-section, of a wire guide.

Wire retainers or guides 60 are disposed on the upper surface 32 to provide a mechanism for guiding and securing a wire harness 62. The wire harness retainer 60 facilitates the attachment or building of wire harness 62 on the upper face 32 of the headliner assembly 20. As shown in FIG. 3, the wire harness retainer 60 is shown with a wire harness 62 disposed therein.

Ribs 64 can be molded into the headliner frame 22 for energy management and to also provide attachment sites for energy absorbing or acoustic foam material as is well known in the art.

Figure 4:
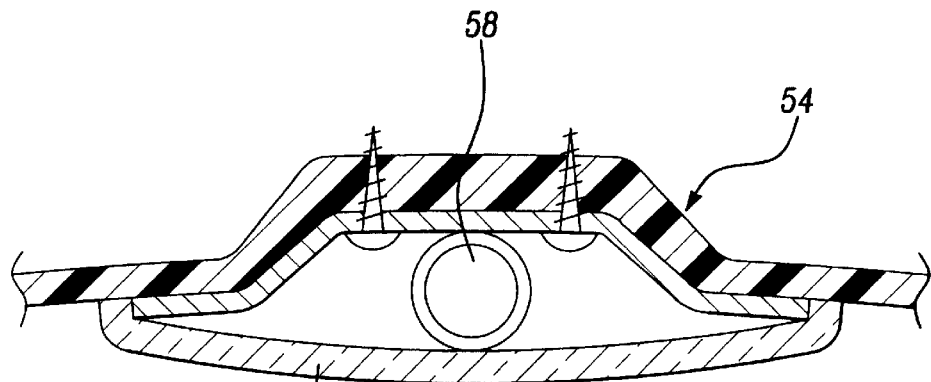
FIG. 4 is a cross-sectional view taken along line 4—4 as shown in FIG. 1.

As shown in FIG. 4, the dome light housing 54 can include a diffuser 56 and a bulb socket 58 housed therein.

Figure 5:
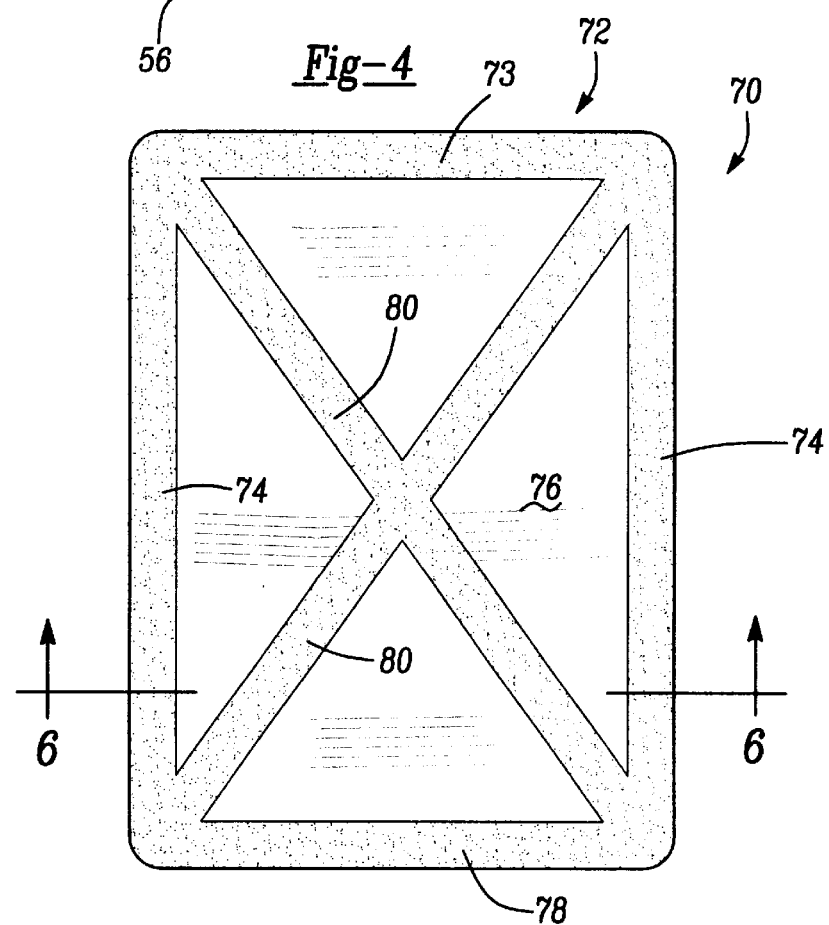
FIG. 5 shows a further embodiment of the present invention.

FIG. 5 shows an embodiment 70 wherein the frame 72 has a rear end 73, and sides 74. A headliner mat 76 completely covers the underside of the frame member 72.

Figure 6:
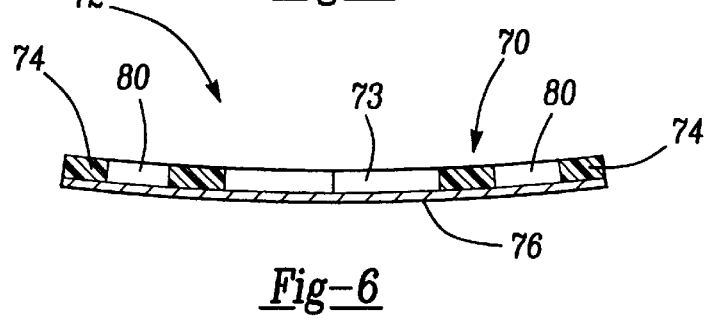
FIG. 6 shows a plan view of the FIG. 5 embodiment.

As shown in FIG. 6, the mat 76 extends over the entirety of the headliner surface. The frame 72 has end member 73, sides 74, and a forward end 78. Crossing members 80 cross across the plane of the headliner material 76. Spaces are disposed between the headliner frame portions, and the panel 76 covers those spaces. As with the previous embodiment, the frame is formed of a more rigid material than the headliner panel. The frame reduces the need for additional mats to provide structural rigidity or integrity to the headliner panel over the prior art.

The headliner frame 22 is preferably formed by injection molding from a polymeric material. The headliner frame 22 can also be formed by extrusion or thermoforming. Preferably, the polymeric material includes polypropylene, polyester, or nylon. The headliner frame 22 can then be mated with a headliner panel or panels 40 by methods such as heat staking, adhesive gluing, etc. In another method, the headliner panel 40 is fused to the headliner frame 22 by preheating the headliner panel 40 and then compressing the headliner panel 40 and headliner frame 22 using a compression tool to form the final structure.

Thus, the invention reduces the cost and weight of the headliner. Of course, the exact shape of the frame can be varied to achieve various design goals. This embodiment may also include the integrally molded components as described above.

Although a preferred embodiment of this invention has been disclosed, a worker of ordinary skill in the art would recognize that certain modifications come within the scope of this invention. For that reason, the following claims should be studied to determine the true scope and content of this invention.

What is claimed is:

1. A headliner assembly, comprising:

a relatively rigid one piece integrally formed headliner frame defined by front and rear rails and laterally extending sides extending with open space between said front and rear rails, and said laterally extending sides, said headliner frame having a first face and a second, non-exposed face for being received between said first face and a ceiling of a vehicle, said headliner frame including at least one accessory formed integrally as one piece with said headliner frame; and a less rigid planar headliner mat fixed to said frame and extending over said open space.

2. A headliner assembly as recited in claim 1, wherein said headliner frame is formed of a polymeric material.

3. A headliner assembly as recited in claim 1, wherein said at least one accessory is a visor retainer disposed on said first surface of said headliner frame.

4. A headliner assembly as recited in claim 1, wherein said at least one accessory is a coat hook disposed on said first surface of said headliner frame.

5. A headliner assembly as recited in claim 1, wherein said at least one accessory is a handle disposed on said first surface of said headliner frame.

6. A headliner assembly as recited in claim 1, wherein said at least one accessory is a fastener disposed on said second surface of said headliner frame for affixing said headliner assembly to the ceiling of the vehicle.

7. A headliner assembly as recited in claim 1, wherein said at least one accessory is an accessory mounting site.

8. A headliner assembly as recited in claim 1, wherein said at least one accessory is a wire harness retainer.

9. A headliner assembly as recited in claim 1, wherein said at least one accessory is a rib.

10. A headliner assembly as recited in claim 1, wherein at least a portion of said first face of said headliner frame is covered by said mat.

11. A headliner assembly, comprising:

an one piece integrally formed headliner frame extending between lateral sides, said headliner frame having a first face and a second, non-exposed face for being received between said first face and a ceiling of a vehicle, said headliner frame including at least one accessory molded integrally as one piece with said headliner frame; and a headliner panel attached to said headliner frame.

12. A vehicle as recited in claim 11, wherein said headliner frame is formed by injection molding.

* * * * *